UNITED STATES PATENT OFFICE.

OSCAR LOEW, OF NEW YORK, N. Y., ASSIGNOR TO JOHN ANDERSON, OF SAME PLACE.

IMPROVEMENT IN THE MANUFACTURE OF ARTIFICIAL STONE.

Specification forming part of Letters Patent No. 126,311, dated April 30, 1872.

Specification of an Improvement in Compositions to be used for the Manufacture of Drain-Pipes and other articles as a substitute for artificial stone.

Pipes, tiles, and artificial stone made of compositions of sand, clay, and resin have been liable to the objection that in hot summer weather or when subject to the action of hot water they become soft. This invention relates to such compositions, and its object is to render such compositions hard at all ordinary temperatures; and to this end it consists in the addition to such compositions of sufficient lime, strontia, baryta, or magnesia to combine chemically with the resin, thereby forming with it a compound which will remain hard at a temperature of nearly 300° Fahrenheit.

In carrying out my invention, I commonly take, by weight, of sand, seventy-two parts; kaolin or fire-clay, fourteen parts; resin, twelve parts; lime, one-half to one part. Melt the resin by heating to about 300° Fahrenheit. Heat the sand to at least the above temperature till it is perfectly dry, put it into the melted resin and stir the two well together. Heat the kaolin or fire-clay to at least a similar temperature, put it into the sand and resin and stir till thoroughly incorporated. The lime having been previously air-slaked is also heated, and is put into the mixture of sand, resin, and kaolin or fire-clay, and stirred in till thoroughly distributed. A small quantity of sulphur may be added, but this is not essential.

The mixture while still hot is packed or rammed tightly into molds of the required form for the articles to be produced. When cold, it sets and hardens. The lime combining chemically with the resin forms resinate of lime, which remains hard at a temperature much higher than that of boiling water.

Any other form of natural silicate may be substituted for sand in this composition. Either strontia, baryta, or magnesia may be substituted for lime in about the same quantity, those minerals combining in like manner with the resin to form resinates with like effect.

Claim.

A composition of sand or silica, clay, and resin in about the proportions specified, and sufficient lime, strontia, baryta, or magnesia to combine chemically with and harden the resin, as herein described.

OSCAR LOEW.

Witnesses:
HENRY T. BROWN,
FRED. HAYNES.